Oct. 12, 1971  A. K. AMELKIN ET AL  3,611,788
DEW-POINT HYGROMETER
Filed Oct. 8, 1969

# United States Patent Office 3,611,788
Patented Oct. 12, 1971

3,611,788
DEW-POINT HYGROMETER
Anatoly Kuzmich Amelkin, Leningradsky prospekt 2, kv. 13; Nikolai Sergeevich Nikolaev, Ploschad, Vosstania 1, kv. 44; and Mikhail Mikhailovich Sergeev, Koptevskaya ulitsa 18b, kv. 47, all of Moscow, U.S.S.R.
Filed Oct. 8, 1969, Ser. No. 864,578
Int. Cl. G01n 25/02
U.S. Cl. 73—17 A
3 Claims

ABSTRACT OF THE DISCLOSURE

A dew-point hygrometer employs a light guide placed in a gaseous medium and having a refractive index greater than the gaseous medium being monitored but less than the refractive index of the condensate formed by cooling the medium. The light guide is illuminated at one end and the transmitted light flux is applied onto a photocell which controls the temperature of a support on which an intermediate portion of the light guide is bent and supported through the intermediary of a backing strip. The support has a refractive index greater than the condensate and the backing has a refractive index less than the light guide. The temperature of the support is monitored to determine the temperature of condensate formation.

---

This invention relates to dew-point hygrometers intended for measuring the humidity of gases by determining the temperature of the surface layer of a condensate in thermodynamic equilibrium with the gas being monitored. The invention may find application for humidity measurements in the systems of air conditioning in aircraft, ground means of transportation, industrial facilities, warehouses, etc. The hygrometer of the invention is also useful as a source of control signals in humidity monitoring automatic systems.

There are known dew-point hygrometers, operating on the method of dew-point measuements and comprising a sensitive dew point optical element consisting of a mirror with means for sending thereon a light flux under a specified angle and means for sensing the light flux reflected therefrom, and also means for varying the mirror temperature in the working zone as well as for measuring the temperature.

The dew-point is found by measuring the temperature of the mirror surface at the moment of condensate appearance on said surface, the moment of condensate formation being recorded from variations of mirror surface reflectance which affect the illumination of a photoelectric cell.

The known dew-point hygrometers incorporate a relatively elaborate optical system, have a narrow temperature measurement range, are susceptible to the presence of contaminants (fumes and dust) in the atmosphere being monitored, and, moreover, offer minimum convenience of operation.

It is an object of the present invention to provide a dew-point hygrometer which will be operable in a wide temperature range and will be noted for its performance reliability.

This object is accomplished by the provision of a dew-point hygrometer which includes a sensitive optical element with means for directing thereon a light flux and means for sensing the light flux reflected therefrom, and means for varying the temperature of the optical element in the working zone as well as for measuring the temperature of the optical element, wherein according to the invention, the optical element is made in the form of a light guide manufactured from a material whose refractive index is greater than that of the gas medium being monitored, but smaller than the refractive index of the condensate formed, said light guide being mounted on a support whose refractive index exceeds that of the condensate, and isolated from said support by a backing having a refractive index smaller than that of the light guide.

It is expedient to bend the light guide in the working zone.

The light guide may be made discontinuous in the working zone, and in the area adjacent to the means for sensing the light flux, the refractive index is greater than that of the condensate formed.

Figure 1:
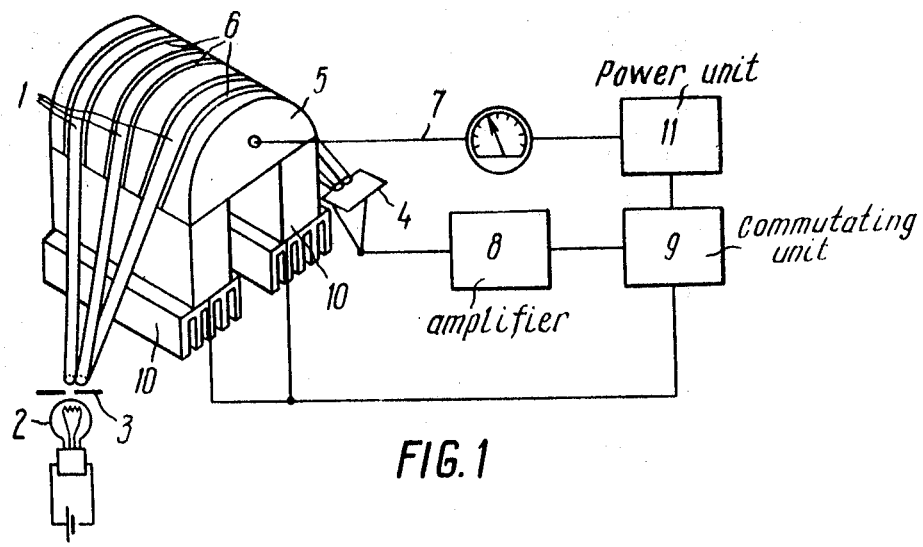
Figure 2:
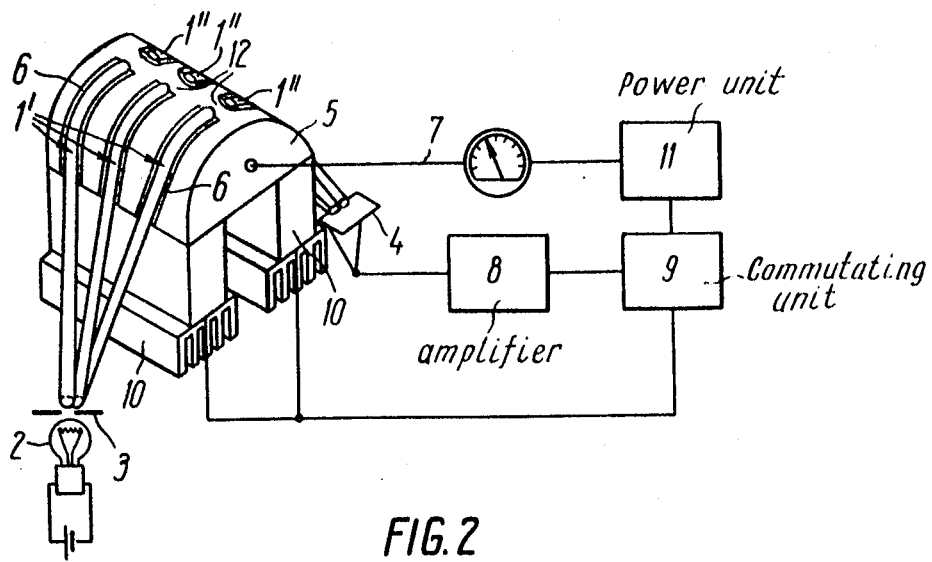

The present invention is illustrated hereinbelow by the detailed description of an exemplary embodiment thereof to be taken in conjunction with the accompanying drawings, wherein:

FIG. 1 is a schematic illustration of the dew-point hydrometer, according to the invention, and FIG. 2 is a schematic illustration of the dew-point hygrometer, in which the light guide is made discontinuous, according to the invention.

The dew-point hygrometer (FIG. 1) incorporates a sensitive dew-point optical element which consists of a light guide made from optical fibres 1. Disposed at one end of the light guide are light source 2 and diaphragm 3, while photoelectric cell 4 is mounted at the other end thereof. Optical fibres 1 are affixed to support 5 having a refractive index greater than that of the condensate formed and isolated from said support 5 by backing 6 made from a material with a refractive index smaller than that of optical fibres 1. In support 5, provision is made or thermometer 7, which is coupled to the circuit of amplifier 8 connected to commutating unit 9. Support 5 is mounted on thermoelectric cooler 10. Light source 2, diaphragm 3, photoelectric cell 4, and the ends of optical fibres 1 are isolated from the gaseous medium being monitored. The hygrometer operates from power unit 11.

Presented in FIG. 2 is a modification of the hygrometer of the invention, wherein the light guide comprises optical fibre in which provision is made for discontinuity 12 in the working zone. Optical fibres 1' are mounted on support 5. Optical fibres 1 adjacent to photoelectric cell 4 have a refractive index greater than that of the condensate formed.

The dew-point hygrometer of the invention operates in the following manner.

The sensitive optical element of the instrument is placed in the gaseous medium being monitored, and, with power unit 11 (FIG. 1) switched on, the light flux from light source 2, on passing through diaphragm 3, strikes the ends of optical fibres 1.

Insofar as the refractive index of the material of optical fibres 1 exceeds that of the gaseous medium being monitored, the light will pass through the fibres, due to the phenomenon of total internal reflection, and strike photoelectric cell 4, which is incorporated into the circuit of amplifier 8. The amplified signal is fed to and actuates commutating unit 9, whereupon there commences current flow through thermoelectric cooler 10, the operation of cooler 10 proceeding until condensate is formed on support 5, which carries optical fibres 1.

As the refractive index of the condensate is greater than that of the material of optical fibres 1, the total internal reflection phenomena is disturbed and as the refractive index of the support is greater than that of the condensate, the light flux is subjected to a double refraction through the condensate and support 5 resulting in a sharp change of the illumination of photoelectric cell 4. The latter phenomenon causing commutating unit 9 to discontinue the supply of current to thermoelectric cooler 10 until the condensate evaporates from support 5, whereupon the cycle of hygrometer operation is repeated.

The temperature of support 5 thus stabilized is measured by means of thermometer 7 calibrated in humidity units.

To enhance the hygrometer sensitivity, optical fibres 1 are bent in the working zone.

In the dew-point hygrometer shown in FIG. 2, activation of power unit 11 actuates commutating unit 9, and there commences current flow through thermoelectric cooler 10 which brings about the cooling of support 5. Thermoelectric cooler 10 operates until condensate forms on the surface of support 5 and bridges the discontinuity in optical fibres 1' resulting in double refraction of the light flux and in a sharp change of the illumination of photoelectric cell 4.

In the present dew-point hygrometer use is made of a sensitive dew-point optical element composed of optical fibres permitting the light source and photoelectric cell to be disposed outside the working zone thus isolating the light guide ends, light source and photoelectric cell from the effects of the gaseous medium being monitored.

The present hygrometer is noted for its high accuracy and a wide temperature range of humidity measurements. The hygrometer makes it possible to monitor the humidity of dust-loaded gases, presents no difficulties in manufacture, and offers maximum convenience of operation.

We claim:

1. A dew-point hygrometer comprising a sensitive optical system placed in a gaseous medium being monitored and comprising a light guide made from a material whose refractive index exceeds that of the gaseous medium being monitored, but is less than the refractive index of the condensate formed, said light guide being elongate and having opposite ends; a support mounting said light guide intermediate the ends thereof, said support having a refractive index greater than that of the condensate; a backing between said support and said light guide and isolating said light guide from said support, said backing having a refractive index less than that of said light guide; means for directing light flux into one end of said light guide; means for sensing the light flux reflected from the other end of said light guide; means for varying the temperature of a working zone of said light guide, and means for measuring the temperature of the working zone of said light guide.

2. A dew-point hygrometer according to claim 1, wherein said light guide is bent in said working zone.

3. A dew-point hygrometer according to claim 1, wherein said light guide is discontinuous in said working zone, the portion of the light guide adjacent to the means for sensing the light flux having a refractive index greater than that of the condensate formed.

References Cited

UNITED STATES PATENTS 3,050,982   8/1962   Vollmer et al. _____ 73—17

OTHER REFERENCES

"Electronic Hygrometer Senses Dew Point Precisely" in Product Engineering, Mar. 11, 1968.

RICHARD C. QUEISSER, Primary Examiner

H. GOLDSTEIN, Assistant Examiner